J. F. CRAVEN.

RECEPTACLE FOR CONTAINING AND DISCHARGING SEMISOLID AND PASTY SUBSTANCES.

APPLICATION FILED SEPT. 4, 1912.

Reissued Apr. 22, 1913.

13,556.

2 SHEETS—SHEET 1.

WITNESSES

E. L. Hyde

H. P. Larkin

INVENTOR

James F. Craven

BY Frederick H. Winter

ATTORNEYS

J. F. CRAVEN.

RECEPTACLE FOR CONTAINING AND DISCHARGING SEMISOLID AND PASTY SUBSTANCES.

APPLICATION FILED SEPT. 4, 1912.

Reissued Apr. 22, 1913.

13,556.

2 SHEETS—SHEET 2.

WITNESSES

Elbert L. Hyde.

H. P. Larkin

INVENTOR

James F. Craven

BY Fredk H. Hinkes

ATTORNEYS

UNITED STATES PATENT OFFICE.

JAMES F. CRAVEN, OF PITTSBURGH, PENNSYLVANIA, ASSIGNOR TO CRAVEN ENGINEERING COMPANY, OF PITTSBURGH, PENNSYLVANIA, A CORPORATION OF PENNSYLVANIA.

RECEPTACLE FOR CONTAINING AND DISCHARGING SEMISOLID AND PASTY SUBSTANCES.

13,556. Specification of Reissued Letters Patent. Reissued Apr. 22, 1913.

Original No. 993,511, dated May 30, 1911, Serial No. 587,086. Application for reissue filed September 4, 1912. Serial No. 718,579.

*To all whom it may concern:*

Be it known that I, JAMES F. CRAVEN, a resident of Pittsburgh, in the State of Pennsylvania, have invented a new and useful Improvement in Receptacles for Containing and Discharging Semisolid and Pasty Substances, of which the following is a specification.

This invention relates to receptacles for containing, storing, transporting and discharging semi-solid and pasty substances.

The device is intended, among other uses, for putting up lubricants in the form of grease and discharging the same into grease cups of machines, and the particular purpose is to enable the grease to be supplied to bearings without liability of dirt or grit entering the bearings with the grease, and also smearing up or soiling the machinery or hands of the user. The invention, however, is not limited to this particular use, but is adapted for putting up in a substantially sealed condition, any semi-solid or pasty substance, such as vaseline, cold cream, and the like, and even butter or lard, and delivering the same from the container in any desired quantity or quantities.

The particular purpose of the present invention is to provide a device for the purpose specified so constructed that it automatically closes the outlet orifice when the operation of discharging the substance ceases.

The invention comprises the construction and arrangement of parts hereinafter described and claimed.

Figure 1:
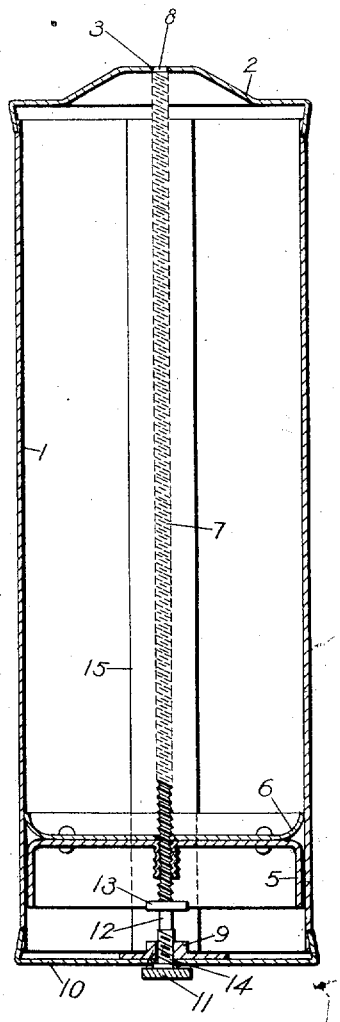
Figure 2:
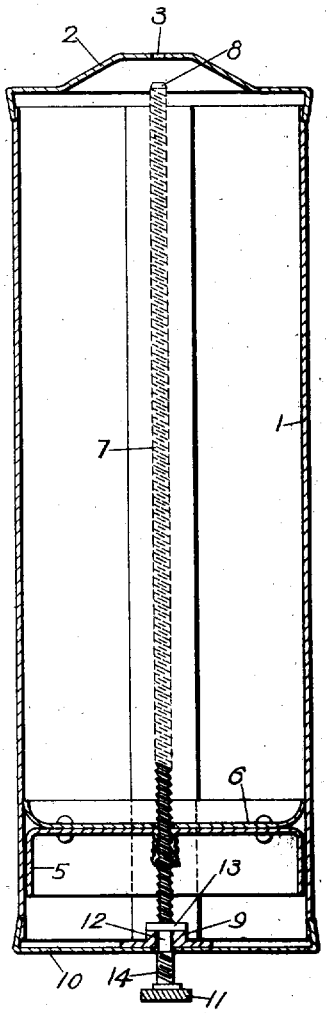
Figure 3:
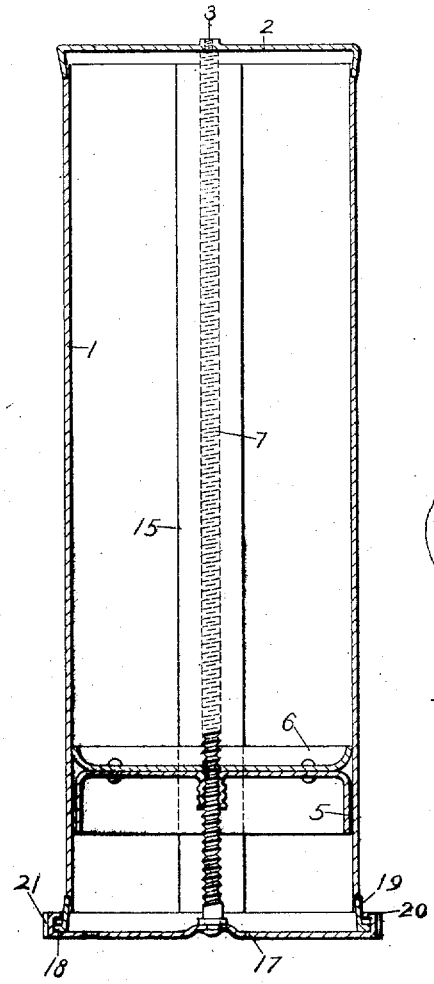
Figure 4:
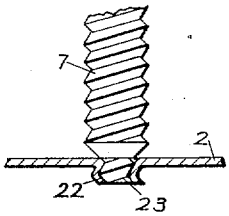
Figure 6:
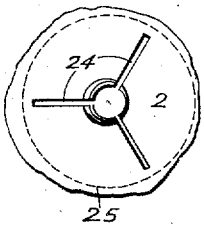
Figure 7:
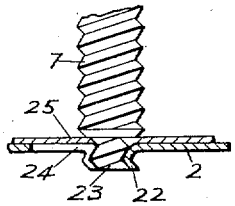
Figure 5:
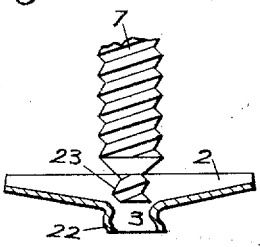

In the accompanying drawings Figure 1 is a vertical section through a device embodying the invention, with the outer orifice closed; Fig. 2 is a similar view showing the outlet orifice open; Fig. 3 is a similar view showing a modification; Figs. 4 and 5 are detail views on an enlarged scale of the discharge portion, showing the same in two different positions; Fig. 6 is a view looking at the discharge end and showing a modification, and Fig. 7 is a sectional view thereof.

The receptacle or container itself may be of any desired size or shape and may be built up or constructed in any desired way and from any desired material. As shown in the drawings the receptacle proper is formed as a substantially cylindrical tube 1 which may be constructed of sheet metal or other suitable thin substance and is shown as formed from paste or paper board. One end of this receptacle is closed by means of the head 2 which may be removable to permit filling the receptacle but which is shown crimped onto the end of the tube 1. This can be done after the receptacle is filled. The head 2 is provided centrally with the discharge orifice 3, which, as shown, is at the extreme end of the container.

In order to force the semi-solid or pasty substance out of the receptacle there is provided a piston or follower 5 preferably provided with a cup leather or the like 6 for giving a close fit in the receptacle. This piston or plunger is adapted to be moved longitudinally in the tubular receptacle and when so moved forces the material out through the discharge orifice 3. Any suitable means for moving the piston may be employed, that shown comprising a threaded rod or screw 7 arranged centrally of the receptacle and extending from end to end thereof, and having one end provided with means for rotating the same. In the form shown in Figs. 1 and 2 the outlet orifice 3 is simply a hole in the head 2, and is adapted to be closed by the end 8 of threaded rod 7, which end is preferably rounded or of conical shape as shown, and forms practically a valve or stopper for the outlet orifice 3. The rod 7 in this case is threaded substantially from end to end, and preferably the threads run left handed. Said rod works in a nut 9 or the like secured to the head 10 crimped or otherwise secured to the tube 1, and at its outer end is provided with a knurled head 11 or the like for turning the same. Somewhat inward from its outer end the rod has its threads cut away to form a plain annular portion or neck 12 which in length is substantially equal to the thickness of nut 9. Inside of the plain portion 12 the rod 7 has a collar or washer 13 secured thereto.

The threaded portion 14 outside of the plain portion 12 works in the stationary nut 9. Consequently when the rod is turned this imparts an endwise or longitudinal movement to the rod 7. We will suppose that the outlet orifice 3 is closed by the end of rod 7. If said rod be rotated in the proper direction it moves endwise until the plain portion or neck 12 gets into the nut 9, after which further endwise movement is arrested by collar 13. This endwise movement withdraws the end of the rod from orifice 3, opening the latter. After this the rod is perfectly free to rotate but is held against endwise movement by collar 13. The piston 5 is held against rotary movement by the combined frictional action of the cup leather against the tube walls and by a longitudinal rib 15 on the inner face of the tube 1 engaging a groove in the piston. This rib in the case of a paper tube will be a strip of paste board pasted to the inner face of the tube 1, and in the case of a sheet metal tube the usual crimped seam of such tubes forms a sufficient rib for this purpose. Consequently the further rotation of rod 7 causes the piston 5 to travel toward the outlet orifice and force the contents of the receptacle out of the same. When the desired amount of material has been expelled the rod 7 is rotated in the opposite direction, thereby backing off the piston 5 to relieve pressure on the contents in the receptacle, and at the same time again causing the threaded portion 14 to engage nut 9 and move the rod 7 endwise until its end 8 closes the orifice 3.

With the form shown in Figs. 3 to 7 the threaded rod 7 is rotated by being secured to a cap 17 which is fitted on the end of the tube 1 so as to rotate thereon, and is either immovable endwise or at least has only a slight endwise movement thereon. This can be accomplished by turning the edge of the head 17 over a flange or shoulder 18 on the end of tube 1, or on a collar 19 crimped or otherwise secured on said tube. When endwise movement is to be permitted a slight space is left between the flange 18 on the tube 1 and the inturned flange 20 on cap 17, and it is so shown on Fig. 3. The peripheral edge of cap 17 is knurled or milled as indicated at 21 so as to give a firm grip to rotate the rod 7. In this form the outlet orifice 3 is formed in a tubular projecting portion 22 on head 2, said projecting portion being internally threaded. The free end of the threaded rod 7 has a reduced portion 23 which projects into the outlet orifice 3 and is externally threaded so as to engage the internal threads in said outlet orifice. The threads on the projection 14 and in the outlet orifice run in the same direction as the threads on the body of the rod or screw 7.

When the receptacle is freshly filled the piston 5 lies against the cap 17, and the projection 23 on the screw rod is in the outlet opening 3, the parts being in the position shown in Fig. 4. To discharge the contents the rod 7 is rotated, by turning the cap 17 thereby causing the piston 5 to travel toward the opposite end of the tube. The rotation of the rod 7 in the proper direction to cause the forward travel of the piston has the effect of unscrewing the projection 23 from the outlet orifice, but since the rod is endwise immovable, or only slightly movable endwise, the effect of this is to crowd or bulge the central portion of the head 2 outwardly, to the position shown in Fig. 5, thereby freeing the outlet sleeve 22 from the projection 23 and permitting the contents to escape. The endwise movement of the rod 7, when permitted, assists in such opening of the orifice 3, or at least increases the extent of the opening. When the desired quantity has been expelled the cap 17 is preferably turned slightly backwardly. This relieves the pressure on the material and permits the resilient head 2 to spring inwardly until the outlet sleeve 22 engages the projection 23 on the screw rod, and further backward rotation of the screw rod causes the oppositely running threads on projection 23 to enter the corresponding threads in the outlet sleeve and pull the central portion of the head 2 inwardly to substantially flat position, or as shown in Fig. 4, thereby entirely closing the outlet orifice and substantially sealing the same.

To permit the head 2 to bulge outwardly at its center it is necessary that it yield or expand. This is permitted by light sheet metal, but in case the rod 7 has no endwise movement the head 2 is preferably provided with one or more radial slits 24 running into the outlet orifice as shown in Fig. 6. To prevent the contents escaping through such slits there is placed immediately inside the head a yielding disk 25 of paper or other suitable flexible material.

In the use of the device the grease or other material is filled into the receptacle at the factory, and the receptacle is then closed, and can be packed, shipped and stored in a practically sealed condition. The filling is preferably done before the head 2 is crimped on. The package has practically no external projections and therefore can be safely packed, shipped and handled, and the means for expelling the material from the package is contained entirely within the package and therefore provides no projection beyond the main casing and does not add to the length of the latter. The material is held in substantially a sealed form, and is discharged in a manner to prevent dirt or grit mixing with the same and is always contained in a tightly closed casing so that the contents will not absorb odors from substances which are stored in the same room or vicinity.

What I claim is:

1. A device of the character described comprising a receptacle provided at one end with a discharge orifice, a piston for exerting pressure on the substance in said receptacle, a threaded rod for actuating said piston, said threaded rod having its end arranged to close the discharge orifice, and a stationary threaded member in which said rod works, said rod having its threads cut away inside of said threaded member to arrest endwise movement of the rod while permitting rotary movement thereof.

2. A device of the character described comprising a receptacle provided at one end with a discharge orifice, a piston for exerting pressure on the substance in said receptacle, a rod having one end arranged to open and close the discharge orifice and having two sets of threads spaced apart by an intermediate smooth portion, one of said sets of threads coöperating with the piston to move the same longitudinally in the receptacle when the rod is rotated, and a stationary threaded member in which the other set of threads works, said stationary threaded member causing endwise movement of said rod when first rotated, and said smooth portion being adapted to be moved into said threaded member and permit free rotation of said rod.

3. A device of the character described comprising a receptacle provided at one end with a discharge orifice and at the other end with a threaded closure, a piston for exerting pressure on the substance in said receptacle, a rod having one end arranged to open and close said discharge orifice and its other end threaded to coöperate with the threads in said closure, said rod also having threaded engagement with the piston to actuate the same, and a smooth unthreaded portion adapted to enter the threads in the closure when the rod is first rotated and permit further loose rotation of said rod in said closure to move the piston endwise.

4. A device of the character described comprising a receptacle provided at one end with a discharge orifice and at the other end with a threaded closure, a piston for exerting pressure on the substance in said receptacle, a rod having one end arranged to open and close said discharge orifice and its other end threaded to coöperate with the threads in said closure, said rod also having threaded engagement with the piston to actuate the same and a smooth unthreaded portion adapted to enter the threads in the closure when the rod is first rotated and permit further loose rotation of said rod in said closure to move the piston endwise, and a collar on said rod inside of said unthreaded portion and adapted to engage said closure to limit endwise movement of the rod in one direction.

5. A container for storing, transporting, and discharging semi-solid or pasty substances comprising a receptacle having caps permanently secured at the ends thereof, one of said caps having a discharge orifice and the other cap having a threaded aperture, a rod having its end arranged to open and close the discharge orifice and threaded into and movable endwise in said threaded cap, a piston threaded on said rod and operated thereby, said rod having a smooth portion to enter the threads in the cap during first rotation of said rod and permit further rotation thereof without endwise movement, and a collar on said rod arranged to engage said threaded cap and limit endwise movement of said rod.

JAMES F. CRAVEN.

Witnesses:
F. W. WINTER,
I. C. STAVER.